J. C. Dickey.
Ore Amalgamator.
N°. 30,670.                    Patented Nov. 20, 1860.

WITNESSES:
Frank L. Pope
Henry S. Powell

INVENTOR:
Julius C. Dickey

UNITED STATES PATENT OFFICE.

JULIUS C. DICKEY, OF SARATOGA SPRINGS, NEW YORK.

GOLD WASHER AND AMALGAMATOR.

Specification of Letters Patent No. 30,670, dated November 20, 1860.

*To all whom it may concern:*

Be it known that I, JULIUS C. DICKEY, of Saratoga Springs, in the county of Saratoga and State of New York, have invented a new and Improved Mode of Constructing Machinery for Washing and Amalgamating Gold; and I do hereby declare that the following is a full and exact description thereof, reference being had to the accompanying drawings and to the letters of reference marked thereon.

The nature of my invention consists in the employment of a circular adjustable bearing on the under side of a hollow revolving cone or shell; which cone or shell works on a stationary cone; the said revolving cone being made with one or more circular projections on the under side of the same and working in one or more channels made on the said stationary cone; every channel on the said stationary cone after the first being depressed or made lower than the preceding one, the said adjustable bearing resting upon balls located in a circular channel made on the said stationary cone, and being for the purpose of adjusting the said revolving cone so that the said circular projections made on the under side of the same will work effectively in the channels on the said stationary cone. Second. The employment of an adjustable plate on the top of the said stationary cone having a grinding or other suitable surface in combination with another adjustable plate having also a grinding or other suitable surface, and secured on the under side of the said revolving cone; the said adjustable plates being made to come in contact with each other and are for the purpose of separating clay, cement, or crushing, grinding, and pulverizing quartz or sand containing gold.

Figure 1:
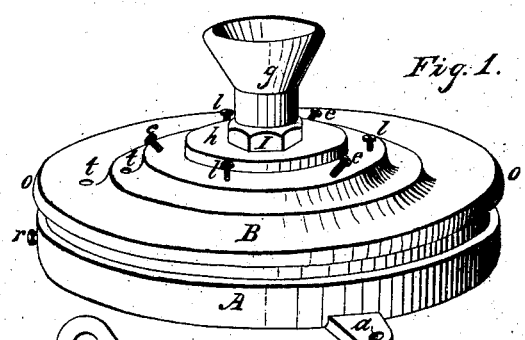
Figure 2:
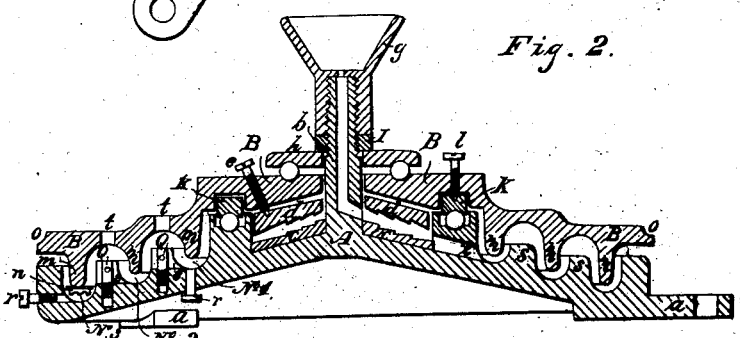

Figure 1 shows a perspective view. Fig. 2 a cross section and Fig. 3 a top view of the stationary cone A.

The stationary cone A, is bolted to a firm foundation by means of the projections $a$ and when it is desirable to make a fire under the said cone for the purpose of heating the mercury or water in the channels the said foundation is made of stone or iron. I make or secure to the under side of the said stationary cone a heater or furnace for the purpose of heating the mercury and water in the said channels, and also for the purpose of generating steam when it is desirable to use steam power in operating the machine. I make the said stationary cone with and without an arrangement for heating the mercury and water in the said channels, as also the stationary cone in the machine patented by me August 28th 1860.

Figure 3:
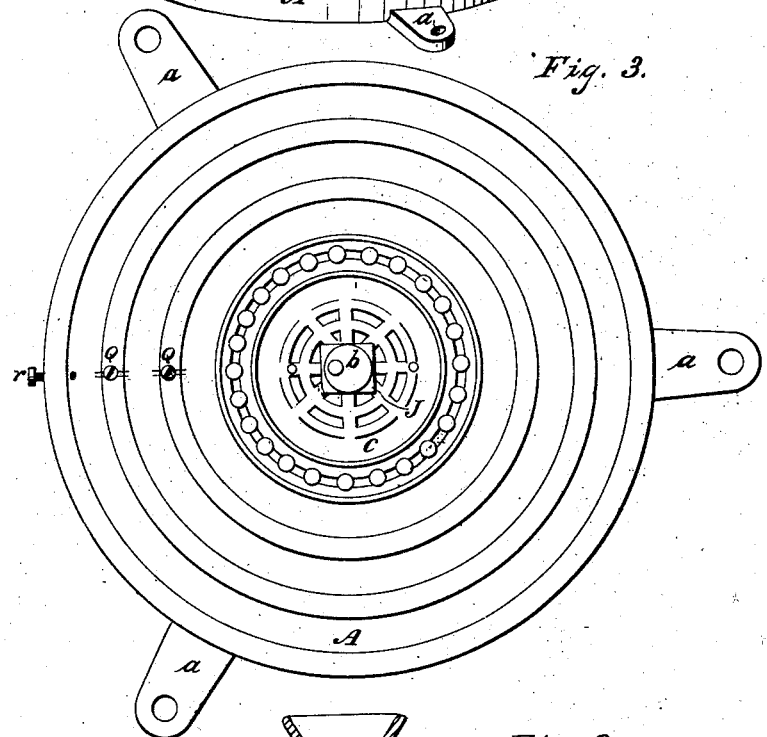

The adjustable plate $c$, as shown in Figs. 2 and 3 is secured to the stationary cone A by means of set screws or other convenient mode. When clay and cement containing gold is worked upon I make projections on the said adjustable plates sufficiently long so that they will break up and separate the clay &c.; and when quartz or sand is worked upon I make the said plate or plates with a grinding surface.

Plate $d$ as shown in Fig. 2 is secured on the under side of the revolving cone B and is forced down on to plate $c$, secured on the stationary cone A by means of the set screws $e$, or other convenient mode. The said plates being made adjustable can be readily removed when sufficiently worn and new plates put in their place.

On a large machine weighing several tons I design to make that part of the revolving cone B, to which the adjustable plate $d$ is secured, adjustable, or separate from the other part of the cone B, so that the adjustable plates can be more readily removed, or secured to the said cones. The hopper $g$, is screwed on to the upright $b$, on the top of cone A. This hopper has a hole in its bottom through which sand, quartz, &c., passes into the opening in the upright $b$, which opening leads to the adjustable plates $c$ and $d$. By turning the said hopper in any direction the size of the opening through which the sand, &c., passes, may be increased or diminished.

The adjustable plate $h$, through which the upright $b$, passes is made with a circular channel on its under side, and rests upon balls located in a circular channel on the top of the revolving cone B. The said plate $h$, is forced down on to the revolving cone B, by means of the screw nut I, which is screwed on to the upright $b$, by which arrangement the adjustable plate $d$, may be forced down by means of the set screws $e$, on to the adjustable plate $c$, and thereby crush grind or pulverize quartz sand &c. as fine as may be desired before it reaches channel No. 1.

In a recess on the under side of the revolving cone B, I secure the circular adjustable bearing $k$. I make on the under justable bearing $k$. I make on the under channel, or recess, and have the said bearing rest upon balls located in a circular channel made on the stationary cone A. This channel as also the channel on the top of the revolving cone B, is furnished with oil so as to make the said revolving cone work with greater ease and less power. This channel on the stationary cone A, and in which the bearing $k$, works may be made on the outer edge of cone A, or between the channels Nos. 1, 2, or 3, and when made between the channels there should be openings made under the channel in which the bearing $k$, works so as to let the quartz, &c. pass through and into channels beyond that in which the bearing works in. The said bearing K, is forced down on to the balls, aforesaid, by means of the set screws $l$, which pass through the revolving cone, and by this means the revolving cone is secured in any desirable position. By this arrangement when mercury is located in channels Nos. 1, 2 and 3, the circular projections $m$, made on the under side of the revolving cone B, are made to extend down to the top, or into the mercury so that it will be impossible for pulverized quartz &c. to pass through the said channels without being forced in contact with the mercury and thus secure the amalgamation of the gold.

Letter $n$, shows an end view of a scraper one end of which is secured on the under side of the projection $m$. This scraper is for the purpose of scraping up any quartz that may be baked on the bottoms of the channels when heat is applied as aforesaid. Its construction may be varied according to circumstances. The quartz may be scraped up as aforesaid also by means of an adjustable rod passing through a hole in the revolving cone B. I also design to make projections on the said projection $m$, for the purpose of scraping up the quartz and assist in amalgamating the gold &c.

Motion may be given to the revolving cone by having a circular row of cogs on its outer edge as shown at letter $o$, which cogs may work in a pinion secured to a shaft working in suitable bearings secured to the base or outer edge of cone A. Also by having a drum secured on the top of the said cone to which drum a belt may be attached. The said cone B, may be made with sectional openings if desirable, and thus make it lighter than it would otherwise be.

The channels Nos. 1, 2 and 3 I make of any desirable form and size and as many as will be necessary to secure a thorough washing and amalgamation of the gold. Every channel after channel No. 1 is depressed or made lower than the one preceding it, by which arrangement the pulverized quartz sand &c. is forced through the channels and in contact with the mercury by its own pressure.

With the view to assist in more finely pulverizing the quartz &c. and washing and amalgamating the gold I design in some cases to have one or more of these channels nearly filled with round balls, and have made on the bottom of one or more of the projections $m$, a circular recess, or channel, to form a seat for the balls; in which case the revolving cone B, may rest upon and revolve on the said balls, instead of those located in the channel in which the bearing $k$ works in. There may also be balls or rollers secured to scraper $n$, or its equivalent and rolling in said channels with the further view of assisting in amalgamating the gold &c.

By inserting a screw driver in the holes $t$ in the revolving cone B and turning the stop-cocks $q$, down, the water and mercury may be let out of the channels at any desirable point when the mercury charged with gold is to be drawn off from said channels. The stop-cocks $r$, shows another mode of letting the water &c. out of said channels. I make these stop-cocks of any desired form and locate them where they will answer the best purpose for which they are intended. The stop-cocks $q$ are screwed into a slot in the circular projections $s$ which separates the channels so that by turning the stop-cocks so that the holes in them will be on a line with the slots the water and mercury is let out of the channels.

When clay and cement is worked upon the use of the hopper $g$ may be discontinued, and the opening made larger than when quartz or sand is worked upon. On small machines or when it is not desirable to grind or pulverize the quarty sand &c. I discontinue the use of the adjustable plates $c$ and $d$, and locate the channel in which the bearing $k$ works in near the center of the machine. The use of the channel may also be discontinued in this case and balls located and used in the channels as aforesaid, and in which case the adjustable plate $h$ may be made to press the revolving cone B, down on to the balls and make the said balls roll and pulverize the sand &c. more effectively. This arrangement being most desirable in small machines which are worked by hand power. These machines when made to weigh ten or fifteen tons may be made in sections so as to be more readily transported, and are made so as to work up quartz sand clay &c. and with the view of being used in all kinds of gold mines.

The most important features of the invention are the arrangement of the adjustable bearing $k$, by which the pulverized quartz sand &c. is forced into the bottoms of the channels in contact with the mercury. Also the arrangement of the adjustable plates $c$, and *d*, by which the quartz sand &c. is crushed ground and pulverized before it reaches the mercury.

Operation: The quartz sand &c being put into the hopper *g*, passes through the same into the opening as shown by the dotted lines in the upright *b*, and through openings in the base of the said upright into and between the adjustable plates *c* and *d*, where it is crushed ground or pulverized and forced by the said plates *c* and *d*, into outlets *x* which lead to channel No. 1, said outlets being made under the circular channel in which the bearing *k*, works in. When channel No. 1 becomes full of pulverized quartz sand or water it flows over the circular projection *s*, into channel No. 2, and so on through the channels. The stop-cocks being turned as aforesaid to let out the water or mercury when it is desirable to remove the gold.

I claim—

1. The bearing *k*, for the purpose specified.

2. The arrangement and use of the adjustable plates *c* and *d* for the purposes set forth.

JULIUS C. DICKEY.

Witnesses:
FRANK L. POPE,
HENRY G. POWELL.